United States Patent
Yanovsky et al.

(10) Patent No.: US 10,931,402 B2
(45) Date of Patent: Feb. 23, 2021

(54) DISTRIBUTED STORAGE SYSTEM DATA MANAGEMENT AND SECURITY

(71) Applicant: Datomia Research Labs OU, Tallinn (EE)

(72) Inventors: David Yanovsky, Tallinn (EE); Teimuraz Namoradze, Tallinn (EE); Vera Dmitriyevna Miloslavskaya, Saint-Peterberg (RU)

(73) Assignee: Cloud Storage, Inc., Shenandoah, TX (US)

(*) Notice: Subject to any disclaimer, the term of this patent is extended or adjusted under 35 U.S.C. 154(b) by 0 days.

(21) Appl. No.: 16/362,209

(22) Filed: Mar. 22, 2019

(65) Prior Publication Data

US 2019/0356416 A1    Nov. 21, 2019

Related U.S. Application Data

(63) Continuation-in-part of application No. 15/460,119, filed on Mar. 15, 2017, now Pat. No. 10,608,784, (Continued)

(51) Int. Cl.
*H04L 1/00* (2006.01)
*H04L 9/32* (2006.01)
(Continued)

(52) U.S. Cl.
CPC ............ *H04L 1/0057* (2013.01); *G06F 3/065* (2013.01); *G06F 3/067* (2013.01); *G06F 3/0619* (2013.01);
(Continued)

(58) Field of Classification Search
CPC . H04L 1/0057; H04L 9/0894; H04L 63/0428; H04L 9/0863; H04L 67/1097;
(Continued)

(56) References Cited

U.S. PATENT DOCUMENTS

| 6,665,308 B1 | 12/2003 | Rakib |
| 6,952,737 B1 | 10/2005 | Coates et al. |

(Continued)

FOREIGN PATENT DOCUMENTS

| CN | 105335150 | 2/2016 |
| CN | 105335160 | 2/2016 |

(Continued)

OTHER PUBLICATIONS

Rizzo, L. (Apr. 1997). "Effective erasure codes for reliable computer communication protocols". ACM Sigcom:M computer communication review, 27(2), 24-36.Retrieved from the internet on Aug. 31, 2015 <http://ccr.sigcomm.org/archive/1997/apr97/ccr-9704-rizzo.pdf> Rizzo, L. Dec. 31, 1997 (Dec. 31, 1997) Whole document.

(Continued)

*Primary Examiner* — Albert Decady
*Assistant Examiner* — Osman M Alshack
(74) *Attorney, Agent, or Firm* — Leason Ellis LLP

(57) ABSTRACT

Secure distributed storage and transmission of electronic content is provided over at least one communication network. At least one data file is received and parsed into a plurality of segments, wherein each one of the segments has a respective size. Thereafter, each of the plurality of segments is divided into a plurality of slices, wherein each one of the slices has a respective size. A plurality of data chunks are encoded, each data chunk comprising a portion of at least two of the slices, wherein no portion comprises an entire slice. The data chunks are packaged with at least metadata, and each of the packages is assigned to respective remote storage nodes. Each of the packages is transmitted to the respectively assigned remote storage node.

20 Claims, 21 Drawing Sheets

Related U.S. Application Data which is a continuation of application No. 15/460,093, filed on Mar. 15, 2017, now Pat. No. 10,735,137.

(60) Provisional application No. 62/646,396, filed on Mar. 22, 2018, provisional application No. 62/308,223, filed on Mar. 15, 2016, provisional application No. 62/332,002, filed on May 5, 2016, provisional application No. 62/349,145, filed on Jun. 13, 2016, provisional application No. 62/434,421, filed on Dec. 15, 2016.

(51) Int. Cl.
| | |
|---|---|
| G06F 11/10 | (2006.01) |
| H03M 13/00 | (2006.01) |
| H03M 13/29 | (2006.01) |
| H03M 13/15 | (2006.01) |
| G06F 3/06 | (2006.01) |
| G06F 12/02 | (2006.01) |
| G06F 12/0846 | (2016.01) |
| G06F 12/14 | (2006.01) |
| G06F 21/00 | (2013.01) |
| H04L 29/08 | (2006.01) |
| G06F 21/62 | (2013.01) |
| H04L 9/08 | (2006.01) |
| H03M 13/13 | (2006.01) |
| H04L 29/06 | (2006.01) |
| G06F 16/174 | (2019.01) |

(52) U.S. Cl.
CPC ...... *G06F 11/1076* (2013.01); *G06F 11/1088* (2013.01); *G06F 12/0253* (2013.01); *G06F 12/0848* (2013.01); *G06F 12/1408* (2013.01); *G06F 12/1466* (2013.01); *G06F 16/1752* (2019.01); *G06F 21/00* (2013.01); *G06F 21/6218* (2013.01); *H03M 13/13* (2013.01); *H03M 13/1515* (2013.01); *H03M 13/2921* (2013.01); *H03M 13/616* (2013.01); *H04L 9/0863* (2013.01); *H04L 9/0894* (2013.01); *H04L 9/3226* (2013.01); *H04L 63/0428* (2013.01); *H04L 67/1097* (2013.01); *G06F 2212/1052* (2013.01); *G06F 2212/282* (2013.01); *G06F 2212/702* (2013.01); *G06F 2221/2107* (2013.01)

(58) Field of Classification Search
CPC . H04L 9/3226; G06F 16/1752; G06F 3/0619; G06F 21/6218; G06F 21/00; G06F 12/1466; G06F 12/1408; G06F 12/0848; G06F 12/0253; G06F 3/067; G06F 3/065; G06F 11/1088; G06F 11/1076; G06F 2212/282; G06F 2212/702; G06F 2221/2107; G06F 2212/1052; G06F 16/1824; H03M 13/13; H03M 13/1515; H03M 13/2921; H03M 13/616
USPC .......................................... 714/776, 752, 770
See application file for complete search history.

(56) References Cited

U.S. PATENT DOCUMENTS

| | | | |
|---|---|---|---|
| 7,010,532 B1 | 3/2006 | Stakutis et al. | |
| 8,296,812 B1* | 10/2012 | Ganesan | H04N 21/2181 725/101 |
| 8,332,375 B2* | 12/2012 | Chatley | A61P 17/00 707/705 |
| 8,442,989 B2 | 5/2013 | Massoulie et al. | |
| 8,576,852 B2 | 11/2013 | Arisoylu et al. | |
| 8,621,318 B1 | 12/2013 | Micheloni et al. | |
| 8,717,885 B2 | 5/2014 | Arisoylu et al. | |
| 8,935,493 B1 | 1/2015 | Dolan | |
| 9,104,691 B2 | 8/2015 | Resch et al. | |
| 9,201,835 B2 | 12/2015 | Akin et al. | |
| 9,864,550 B2 | 1/2018 | Song et al. | |
| 9,916,198 B2 | 3/2018 | Baker et al. | |
| 10,216,740 B2 | 2/2019 | Neporada et al. | |
| 2001/0001616 A1 | 5/2001 | Rakib | |
| 2002/0133491 A1 | 9/2002 | Sim | |
| 2003/0074486 A1 | 4/2003 | Anastasiadis | |
| 2005/0216813 A1 | 9/2005 | Cutts | |
| 2007/0005795 A1 | 1/2007 | Gonzalez | |
| 2007/0008847 A1 | 1/2007 | Maruyama | |
| 2007/0079083 A1 | 4/2007 | Gladwin et al. | |
| 2008/0046104 A1 | 2/2008 | Van Camp et al. | |
| 2009/0199274 A1 | 8/2009 | Frazier et al. | |
| 2009/0228763 A1* | 9/2009 | Wang | H04N 21/4382 714/776 |
| 2010/0094957 A1 | 4/2010 | Zuckerman et al. | |
| 2010/0218037 A1 | 8/2010 | Swartz et al. | |
| 2010/0250497 A1 | 9/2010 | Redlich et al. | |
| 2011/0072115 A1 | 3/2011 | Gladwin et al. | |
| 2011/0106972 A1 | 5/2011 | Grube et al. | |
| 2011/0161666 A1 | 6/2011 | Gladwin et al. | |
| 2011/0219100 A1 | 9/2011 | Dhuse et al. | |
| 2012/0060072 A1 | 3/2012 | Simitci et al. | |
| 2013/0111166 A1 | 5/2013 | Resch et al. | |
| 2013/0117560 A1 | 5/2013 | Resch | |
| 2014/0136571 A1 | 5/2014 | Bonvin et al. | |
| 2014/0278807 A1 | 9/2014 | Bohacek | |
| 2014/0351624 A1 | 11/2014 | Resch | |
| 2014/0380114 A1 | 12/2014 | Alexeev et al. | |
| 2015/0067819 A1 | 3/2015 | Shribman | |
| 2015/0256617 A1* | 9/2015 | Klose | G06F 16/972 709/217 |
| 2016/0072891 A1* | 3/2016 | Joshi | G05D 23/1393 370/254 |
| 2017/0048021 A1 | 2/2017 | Yanovsky et al. | |
| 2017/0063397 A1 | 3/2017 | Richardson | |
| 2017/0272100 A1 | 9/2017 | Yanovsky et al. | |
| 2017/0272209 A1 | 9/2017 | Yanovsky et al. | |
| 2017/0286223 A1 | 10/2017 | Baptist | |
| 2018/0018261 A1 | 1/2018 | Vekiarides et al. | |
| 2018/0018285 A9 | 1/2018 | Volvovski et al. | |
| 2018/0218073 A1 | 8/2018 | Wilshinsky et al. | |
| 2019/0182115 A1 | 6/2019 | Wilshinsky et al. | |

FOREIGN PATENT DOCUMENTS

| | | |
|---|---|---|
| WO | WO 2014/005279 | 1/2014 |
| WO | WO 2014/0102565 | 7/2014 |
| WO | WO 2015/057240 | 4/2015 |
| WO | WO 2015/0175411 | 11/2015 |
| WO | WO 2017/161050 | 9/2017 |

OTHER PUBLICATIONS

Li, Mingqiang, "On the Confidentiality of Information Dispersal Algorithms and Their Erasure Codes", Mar. 13, 2013, the Chinese University of Hong Kong, pp. 1-4.

Dimakis, A.G., et al., "Network coding for Distributed Storage Systems," IEEE Transactions of Information Theory, vol. 56, No. 9, Sep. 2010, pp. 4539-4551.

Rabin, M.O., "Efficient Dispersal of Information for Security, Load Balancing, and Fault Tolerance," Journal of the Association for Computing Machinery, vol. 36, No. 2, Apr. 1989, pp. 335-348.

Blokh, E.L., et al., Math-Net.Ru—All Russian mathematical portal, "Coding of Generalized Concatenated Codes," Problems of Information Transmission, 1974, vol. 10, No. 3, http://www.mathnet.ru/eng/agreement, pp. 218-222.

Arikan, E., "Channel Polarization: A Method for Constructing Capacity-Achieving Codes for Symmetric Binary-Input Memoryless Channels," IEEE Transactions on Information Theory, vol. 55, No. 7, Jul. 2009, pp. 3051-3073.

(56) References Cited

OTHER PUBLICATIONS

Zyablov, V. et al., "An Introduction to Generalized Concatenated Codes*," European Transactions on Telecommunications, vol. 10, No. 6, Nov.-Dec. 1999, pp. 609-622.

Miloslayskaya V., Trifonov P. "Design of polar codes with arbitrary kernels" Proceedings of IEEE Information Theory Workshop. Sep. 3-7, 2012. pp. 119-123.

Miloslayskaya V., Trifonov P. "Sequential Decoding of Reed-Solomon Codes" Proceedings of International Symposium on Information Theory and Applications. Oct. 26-29, 2014. pp. 424-428.

\* cited by examiner

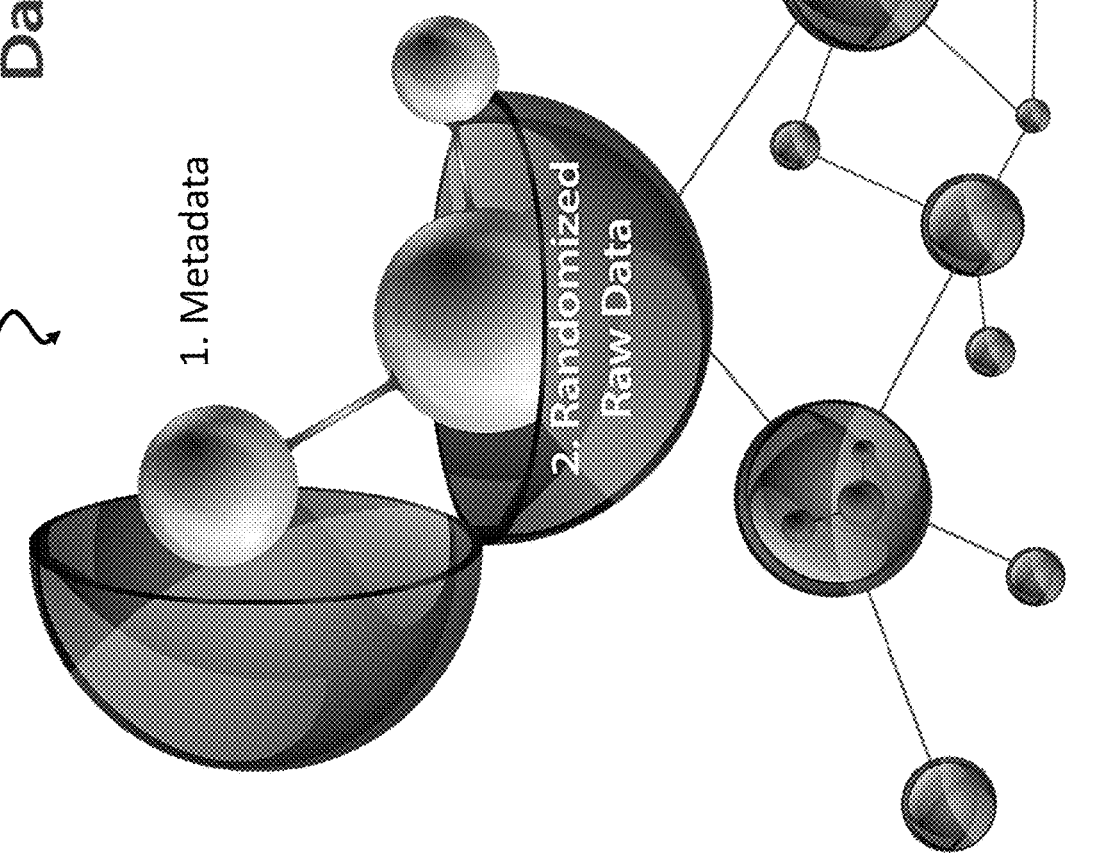

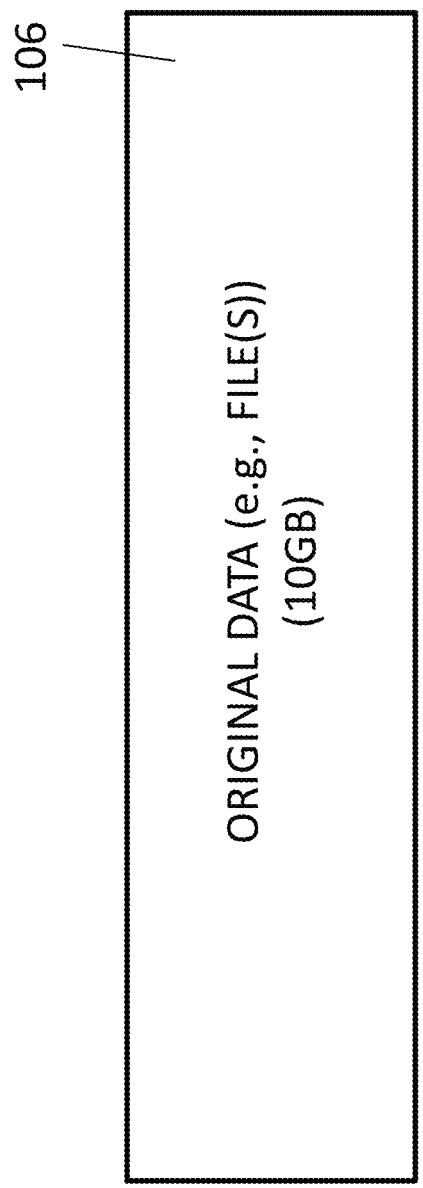

Fig. 6B

| | | | | | | | | |
|---|---|---|---|---|---|---|---|---|
| Amazon S3 | Google | Azure | IBM | SFTP | ISO | BoltDB | Dir | |
| Europe | USA | | | | | | | |

| STORAGE NAME | PROVIDER | | STATUS |
|---|---|---|---|
| Company 2 EU North | Company 2 | | ON |
| Company 2 EU West | Company 2 | | ON |
| Company 2 US East | Company 2 | | ON |
| Company 2 North Central | Company 2 | | ON |
| Company 2 US South | Company 2 | | ON |
| Company 2 US West | Company 2 | | ON |
| Company 3 EU | Company 3 | | ON |

Fig. 6C

Edit Vault

VAULT NAME
US

SIZE OF BLOCKS
10 MB ▼

HIGH SECURE ☑

REDUNDANCY ──○────── 1/9 (10.0%)

ENCRYPT ☐

ENCRYPTION ALGORITHM AES-128 ▼

| | Co. 3 | Co. 2 | Co. 4 | Co. 5 | Co. 6 | Co. 7 | Co. 8 |
|---|---|---|---|---|---|---|---|
| Europe | USA | | | | | | |

| | STORAGE NAME | PROVIDER |
|---|---|---|
| ☐ | Company 2 EU North | Company 2 |
| ☐ | Company 2 EU West | Company 2 |
| ☑ | Company 2 US East | Company 2 |
| ☑ | Company 2 US North Central | Company 2 |
| ☑ | Company 2 US South | Company 2 |

Cancel

Fig. 6D

| DATE | NAME | SIZE | TYPE | VAULT | STORAGE MAC... | AVG SPEED | DURATION |
|---|---|---|---|---|---|---|---|
| 12/20/2017 11:37:32 AM | 3G.dat | 3.0 GB | upload | US2 | US2 | 171.38 Mbps | 00:02:23 |
| 12/7/2017 2:30:52 PM | 3G.dat | 3.0 GB | upload | US2 | US2 | 180.09 Mbps | 00:02:16 |
| 11/26/2017 10:49:23 AM | 3G.dat | 3.0 GB | upload | US2 | US2 | 188.88 Mbps | 00:02:10 |
| 11/22/2017 12:34:01 AM | 3G.dat_1511303840 | 3.0 GB | wipe | US2 | US2 | 591.52 Mbps | 00:00:42 |
| 11/22/2017 12:33:18 AM | 3G.dat_1511288265 | 3.0 GB | wipe | US2 | US2 | 569.80 Mbps | 00:00:43 |
| 11/22/2017 12:32:40 AM | 3G.dat_1511114332 | 3.0 GB | wipe | US2 | US2 | 660.70 Mbps | 00:00:37 |

Fig. 6G

DISTRIBUTED STORAGE SYSTEM DATA MANAGEMENT AND SECURITY

CROSS-REFERENCE TO RELATED APPLICATIONS

This application is based on and claims priority to U.S. Provisional Patent Application No. 62/646,396, filed Mar. 22, 2018. Further, this application is a continuation-in-part of U.S. Non-Provisional patent application Ser. No. 15/460,119, filed Mar. 15, 2017, which is a continuation of Ser. No. 15/460,093, filed Mar. 15, 2017, and which claims priority to: U.S. Provisional Patent Application No. 62/308,223, filed Mar. 15, 2016; U.S. Provisional Patent Application No. 62/332,002, filed May 5, 2016; U.S. Provisional Patent Application No. 62/349,145, filed Jun. 13, 2016; and U.S. Provisional Patent Application No. 62/434,421, filed Dec. 15, 2016, each of which is incorporated by reference in its entirety as if expressly set forth herein.

FIELD

The application described herein, generally, relates to a distributed storage system and, more particularly, to techniques for data protection, efficiency and security in distributed storage systems.

BACKGROUND

Distributed storage systems play an important role in management of big data, particularly for data generated at tremendous speed. A distributed storage system may require many hardware devices, which often results in component failures that require recovery operations. Moreover, components in a distributed storage system may become unavailable, such as due to poor network connectivity or performance, without necessarily completely failing. In view that any individual storage node may become unreliable, redundancy measures are often introduced to protect data against storage node failures and outages, or other impediments. Such measures can include distributing data with redundancy over a set of independent storage nodes.

One relatively simple redundancy measure is replication. Replication, particularly triple replication, is often used in distributed storage systems to provide fast access to data. Triple replication, however, can suffer from very low storage efficiency which, as used herein, generally refers to a ratio of an amount of original data to an amount of actually stored data, i.e., data with redundancy. Error-correcting coding, and more particularly erasure coding, provides an opportunity to store data with a relatively high storage efficiency, while simultaneously maintaining an acceptable level of tolerance against storage node failure. Thus, a relatively high storage efficiency can be achieved by maximum distance separable (MDS) codes, such as, but not limited to, Reed-Solomon codes. Long MDS codes, however, can incur prohibitively high repair costs. In case of employing locally decodable codes, for example, any single storage node failure can be recovered by accessing a pre-defined number of storage nodes and by performing corresponding computations. Locally decodable codes (LDC) are designed to minimize I/O overhead. In the case of cloud storage systems, minimization of I/O overhead is especially desirable because data transmission can consume many resources, while computational complexity is less significant. In spite of promising theoretical results, the number of practical constructions of LDC codes is low. It is recognized by the inventors that some generalized concatenated codes (GCC) demonstrate a property of locality. Yet another important consideration regards bandwidth optimization, which leads to reduced latency. Regenerating codes can be used to reduce the amount of data transmitted during repair from each storage node. One drawback, however, is that advantages provided by regenerated codes are limited to partial read operations within storage system.

It is observed that requirements of error-correcting code in redundant arrays of independent disks (RAID) can be different, such as in view of computational complexity and storage efficiency. Moreover, the number of disks within a RAID is usually limited to a relatively low number, resulting in codes having a relatively small length being employed. Accordingly, array codes such as RDP, EVENODD, are not optimal for cloud storage systems and distributed storage systems, in general.

Yet another consideration of cloud storage systems is security and, more particularly, data encryption. The computation complexity of data encryption is high, unfortunately, and maintaining keys continues to be an operational issue. Alternative approaches can include mixing original data, such that any amount of original data can be reconstructed only by accessing not less than a pre-defined number of storage nodes. This pre-defined number of storage nodes is such that probability that a malicious adversary is able to access all these nodes is negligible.

BRIEF SUMMARY

In accordance with one or more implementations of the present application, a system and method provide secure distributed storage and transmission of electronic content over at least one communication network. At least one data file is received and parsed into a plurality of segments, wherein each one of the segments has a respective size. Thereafter, each of the plurality of segments is divided into a plurality of slices, wherein each one of the slices has a respective size. A plurality of data chunks are encoded, each data chunk comprising a portion of at least two of the slices, wherein no portion comprises an entire slice. The data chunks are packaged with at least metadata, and each of the packages is assigned to respective remote storage nodes. Each of the packages is transmitted to the respectively assigned remote storage node.

By way of further example, the step of packaging includes erasure coding, wherein the metadata is encoded and not visible to unauthorized users.

By way of further example, at least one processor abstracts the metadata with two or more of: additional metadata associated with a respective remote storage node; a configuration of a data vault; a hyperlink to an active data vault; and information representing a current state of data blocks.

By way of further example, the metadata includes information for reconstructing related segments from corresponding packages and/or information for reconstructing the at least one data file from the plurality of segments.

By way of further example, each of the packages include at least some redundant information from at least one other package.

By way of further example, at least one processor determines at least one parameter representing at least one of available network bandwidth, geographic proximity, and node availability, wherein selection of respective remote storage nodes is made as a function of the at least one parameter.

By way of further example, at least one processor applies categories of data, wherein the step of encoding is based at least in part on a respective category.

By way of further example, the respective storage nodes are provided as network addressable storage.

By way of further example, at least one processor provides a graphical user interface that is configured to display at least one map showing locations of the respective storage nodes and a respective operational status of the respective storage nodes.

By way of further example, the graphical user interface includes an interactive dashboard that identifies information associated with available storage space, used space, and a number of stored data objects.

It is with respect to these and other considerations that the disclosure made herein is presented. Features and advantages of the present invention will become apparent from the following description of the invention that refers to the accompanying drawings.

BRIEF DESCRIPTION OF THE DRAWINGS

Aspects of the present disclosure will be more readily appreciated upon review of the detailed description of its various embodiments, described below, when taken in conjunction with the accompanying drawings, of which:

FIG. 3 is a simplified illustration of an example package, in accordance with an example implementation of the present application;

FIGS. 4A-4F are block diagrams illustrating data management in connection with generating packages including codeword data chunks that include respective slices of file segments and encoded metadata, in accordance with one more example implementations of the present application;

FIGS. 6A-6K illustrate example interactive data entry screens provided one or more graphical user interfaces, in accordance with an example implementation of the present application.

DETAILED DESCRIPTION

Figure 1:
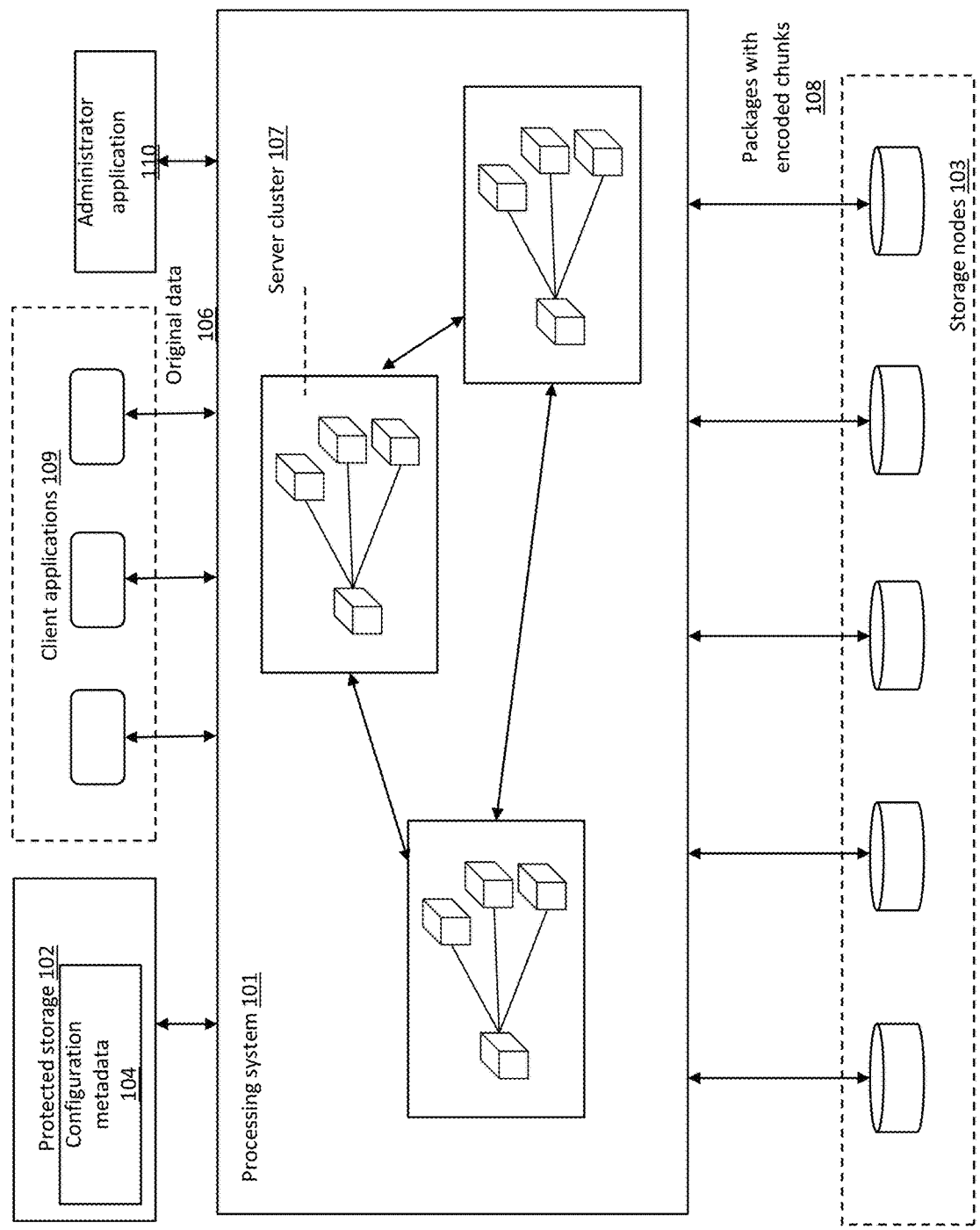
FIG. 1 is a schematic block diagram illustrating a distributed storage system interacting with client applications in accordance with an example implementation of the present application.

By way of overview and introduction, the present application includes systems and methods for distributing data over a plurality of respective remote storage nodes. One or more processors that are configured by executing code can process data, such as of one or more files, and split the data into segments, with each segment being encoded into a number of codeword chunks. In one or more implementations, the processor(s) is configured to process the data such that none of the codeword chunks contains any complete one of the segments. Moreover, the processor(s) is configured to process the data such that each codeword chunk can be packaged with metadata to represent, for example, encoding parameters and identifiers for at least one file and/or for related segments of at least one file. Corresponding systems and methods are further shown and described in commonly assigned, co-pending U.S. Non-Provisional patent application Ser. No. 15/304,457, filed Oct. 14, 2016, and U.S. Non-Provisional patent application Ser. No. 15/460,093, filed Mar. 15, 2017, each of which is incorporated by reference as if expressly set forth set forth in its respective entirety herein.

Features and functionality shown and described herein is in the general context of computer system executable instructions, such as program modules, being executed by one or more computer systems. Generally, program modules include routines, programs, objects, components, logic, data structures, and so on that perform particular tasks or implement particular abstract data types. In a distributed cloud computing environment, program modules can be located in both local and remote computer system storage media including memory storage devices. Accordingly, modules can be configured to communicate with and transfer data to each other.

Metadata for the file(s) contain information that is usable for reconstructing the related segments from corresponding packages and/or to reconstruct the file(s) from the segments. As noted herein, packages can be respectively assigned to remote storage nodes that can be selected and correspond to an optimized workload distribution. For example, the selection of respective storage nodes can be based on various parameters, including available network bandwidth, geographic proximity, node availability or other suitable criteria. Each of the packages can be transmitted to at least one respective storage node, which can thereafter be retrieved for future assemblage of the segment(s) and data.

Accordingly, and as shown and described herein, the present application provides secure distributed storage and transmission of data for use in various contexts including, for example, streaming and other applications. The dispersed storage of data, including in particular streaming media data, on cloud servers is particularly useful. In certain implementations, media content including, without limitation video or audio content, can be made available for streaming through the Internet via the secure and distributed storage systems and methods shown and described herein.

In one or more implementations, data that are stored within a distributed storage system can be classified in several categories, and different coding techniques can be applied to the different data categories. For example, erasure coding techniques maximize storage efficiency and can be applied to a plurality of files containing original data, and metadata can be generated, packaged, and applied to minimize access latency.

Accordingly, the present application provides a big data storage solution that improves, for example, security, efficiency, performance, and availability. Data can be stored on large-scale storage devices set forth in multiple and disparate geographic regions. Moreover, erasure-coding provides data integrity, and provided for customers via one or more global filesystems. The present application further provides for data scaling, that is capable of forming highly available clusters, such as global computing storage nodes and across a network into a customer's own private data center. Significantly, in the event that a number of available storage nodes is not less than a pre-defined threshold, data recovery is possible.

Referring now to the drawings, FIG. 1 is a schematic block diagram illustrating a distributed storage system interacting with client applications, in accordance with an example implementation of the present application. Original data 106, e.g., files produced by client applications 109, are distributed over a set of storage nodes 103, and original data 106 is available to client applications 109 upon request. Any system producing and receiving data on the client side can be considered as an instance of a client application 109. Further, data processing and transmission control are arranged by processing system 101, located on the client side. According to the present application, processing system 101 can include one or several server clusters 107 in which original data 106 are transformed into encoded chunks 108, and vice-versa. As noted herein, generally, a server cluster 107 can include a file system server and one or more processing servers, although a server cluster may include just an individual server.

Client applications 109, processing system 101 and storage nodes 103 communicate via a data communication network, such as the Internet. Storage nodes 103 can operate independently from each other, and can be physically located in different areas. Processing system 101 ensures data integrity, security, protection against failures, compression and deduplication. In one or more implementation, configuration of processing system 101 is specified by configuration metadata 104 maintained within highly protected storage 102. System configuration may be adjusted via an administrator application 110. Example interactive data entry display screens in accordance with an example graphical user interface associated with application 110 are provided herein.

Figure 2:
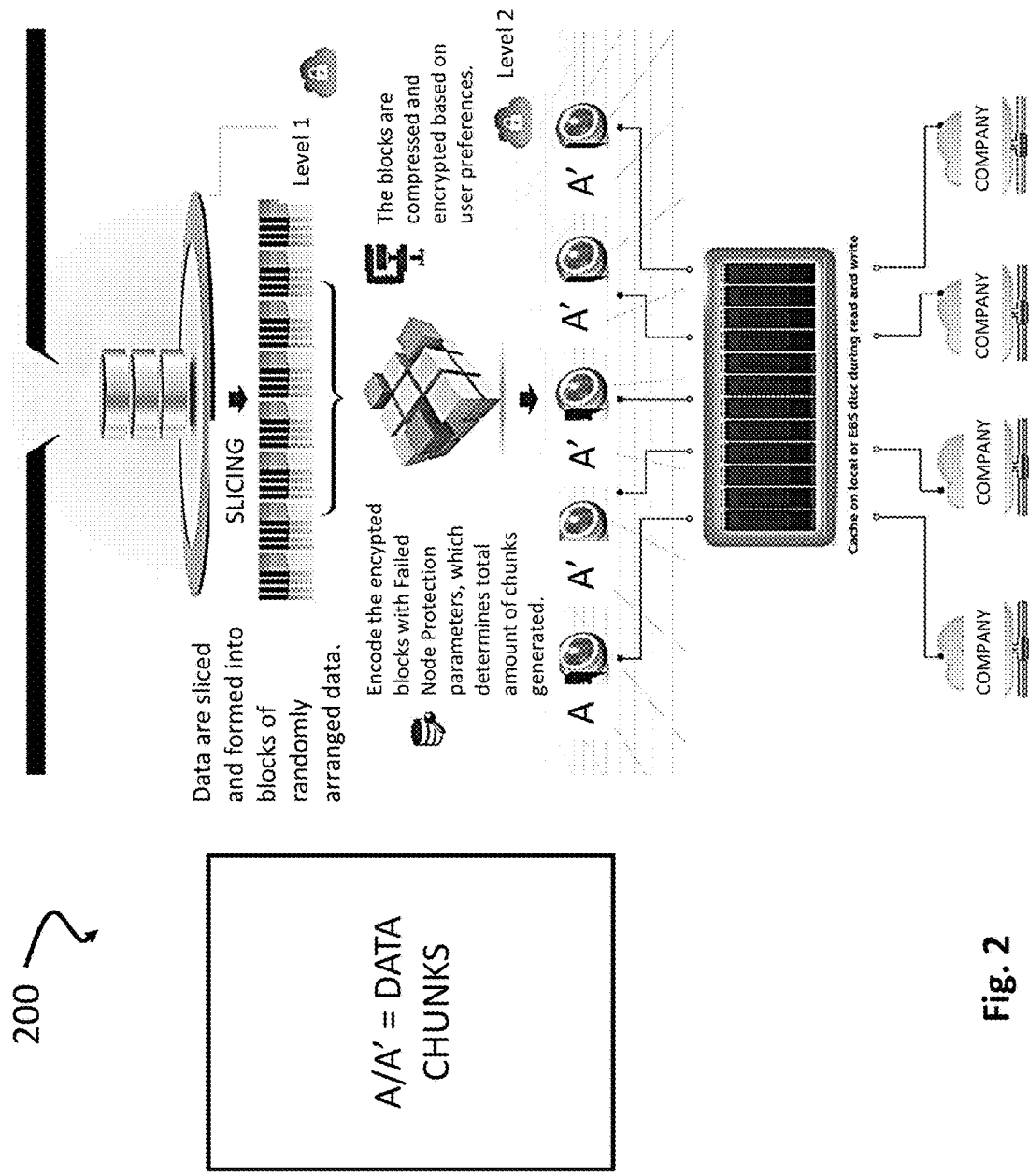
FIG. 2 illustrates data encoding and distribution, in accordance with an example implementation.

As noted herein, the present application configures one or more processing devices to partition objects into segments, and each segment can be further encoded into a number of chunks, which can be transferred to storage nodes. This structure significantly simplifies storage implementation processes, without compromising data security, integrity, protection and storage performance. For example and illustrated in the example implementation shown in FIG. 2, information about data is encrypted at the client and stored securely within packages with encapsulated encoded chunks that are dispersed across storage nodes. As illustrated in the example system 200 in FIG. 2, a plurality of application servers, data vaults, a process is implemented in a virtual machine instance that includes operations for, for example, encryption, compression, and protection and, moreover, slicing the information into a respective chunks and objects. The erasure codec generates various types of encoded chunks, which are spread across all the storage nodes and deployed for a vault installation.

As noted herein, the present application configures one or more processing devices to partition objects into segments, and each segment can be further encoded into a number of chunks, which can be transferred to storage nodes. This structure significantly simplifies storage implementation processes, without compromising data security, integrity, protection and performance. In one or more implementations, information about data is encrypted and stored securely within packages with encapsulated encoded chunks that are dispersed across storage nodes. Moreover, and with reference to the example package with encoded chunk 300 shown in FIG. 3, metadata 104 can be encoded in a way that is only visible and retrievable by the authorized data owner. This is implemented by abstracting erasure-coded metadata 104 and network addressable storage ("NAS") metadata, which is thereafter dispersed between different storage nodes. A package can be configured to contain encoded chunk together with related metadata 104: storage nodes configuration; a vault configuration; a link to active vault snapshot; and a current state of data blocks used for snapshot.

Figure 4B:
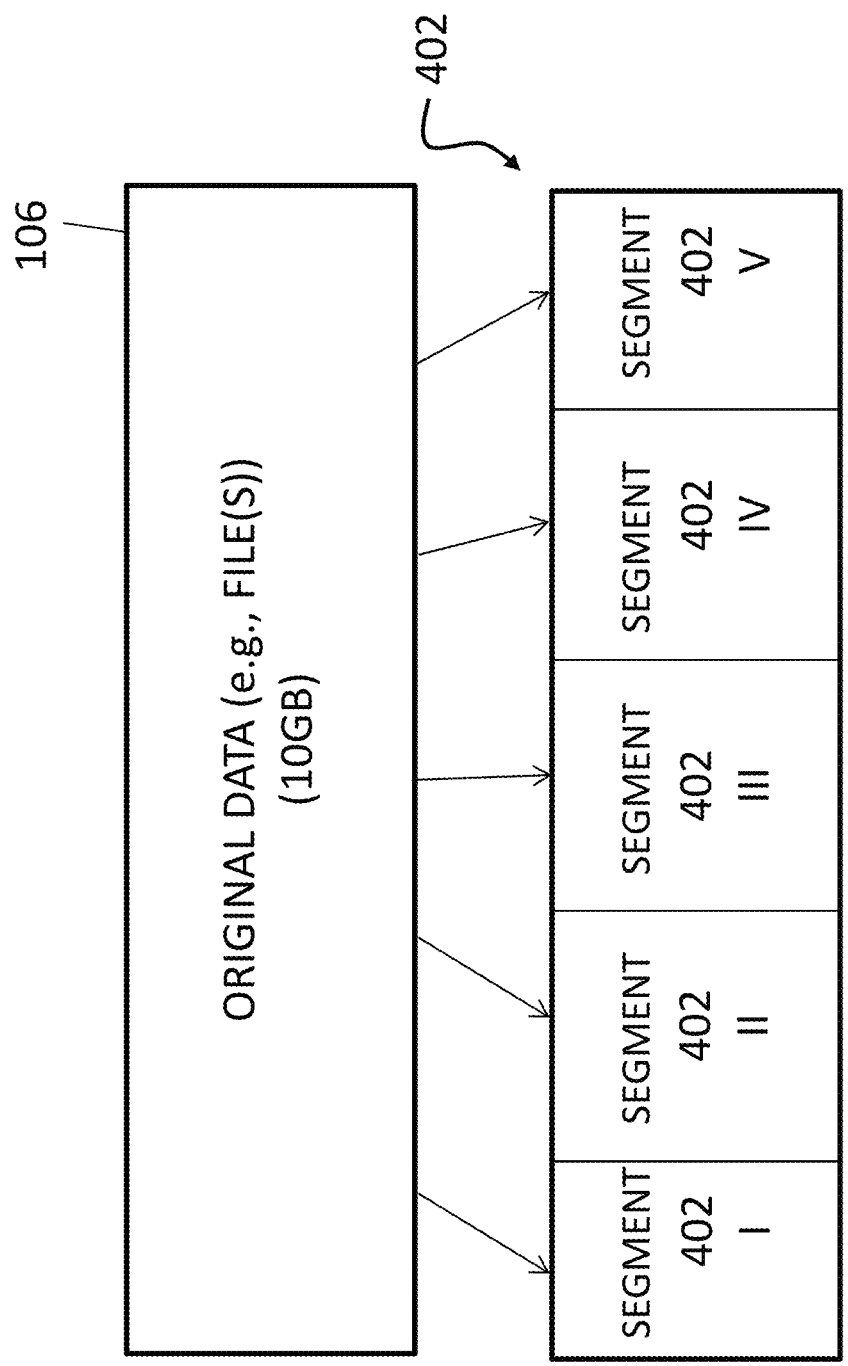

FIGS. 4A-44E are block diagrams illustrating data management in connection with generating packages, including codeword data chunks that include respective slices of file segments and encoded metadata 104, in accordance with one more example implementations of the present application. FIG. 4A, for example, illustrates original data 106 that may include one or more data files having a total data size of 10 GB. Original data 106 is parsed into five segments 402, as illustrated in FIG. 4B, including segments 402 I, 402 II, 402 III, 402 IV and 402 V. The respective original data 106 in FIG. 4B is divided into the five respective segments for illustrative purposes only, and it is to be understood that original data 106 can be divided into virtually any number of segments, with each segment being defined to have any respective size.

Figure 4C:
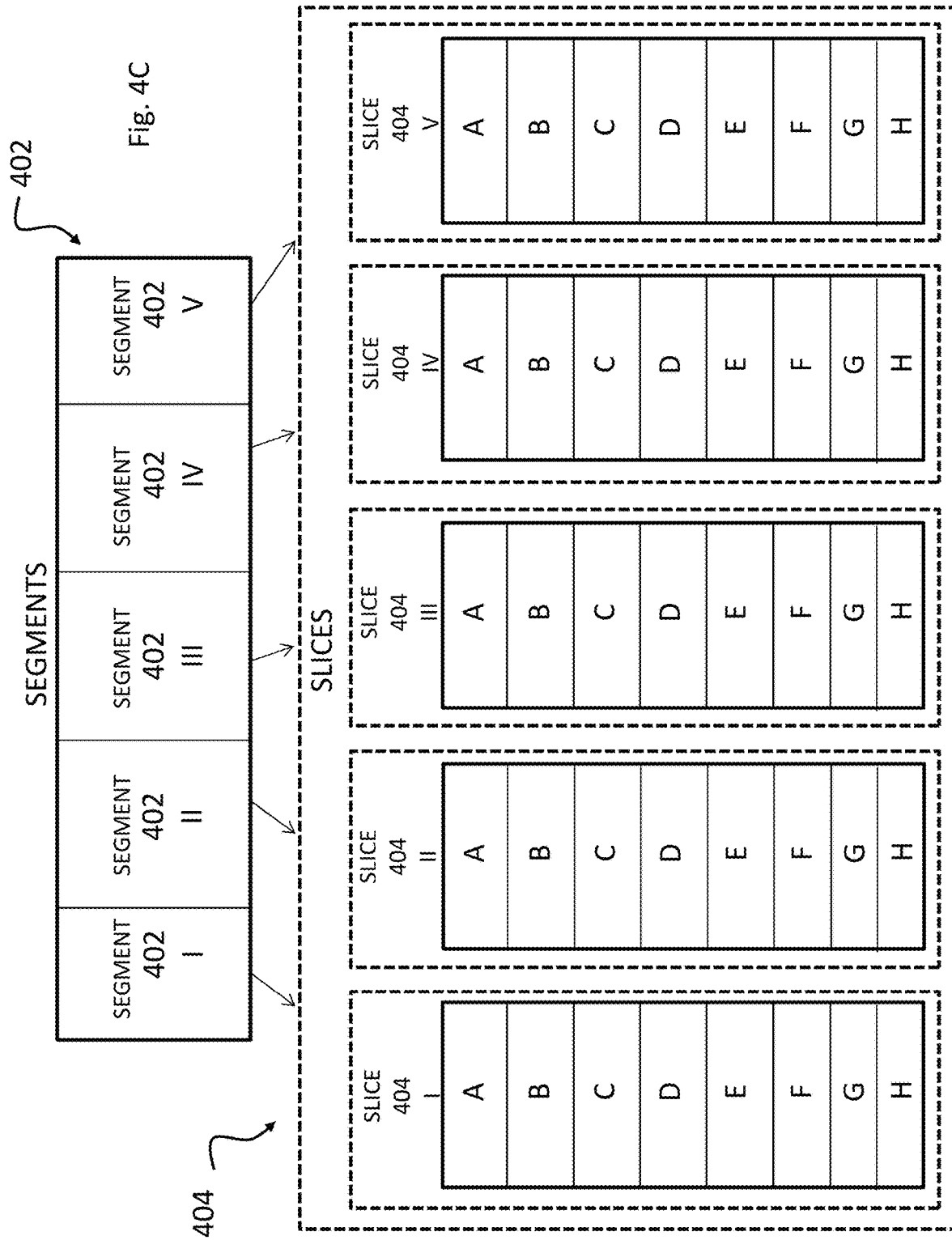

FIG. 4C illustrates continued data management in connection with an example implementation of the present application. In the example shown in FIG. 4C, segments 402 I-402V are each parsed into groups of seven slices 404. For example, segment 402 I is parsed into a group of slices 404 I, and includes 404 IA, 404 IB, 404 IC, 404 ID, 404 IE, 404 1F and 404 1G. In the example shown in FIG. 4C, each of the respective segments (402 I, 402 II, 402 III, 402 IV and 402 V) is parsed into respective slice groups comprising 7 slices (e.g., A-G). The respective slices A-G illustrated in FIG. 4C, comprising five respective groups of slices, are provided for illustrative purposes only, and it is to be understood that segments 402 can be divided into virtually any number of slices 404, with each slice being defined to have any respective size.

Figure 4D:
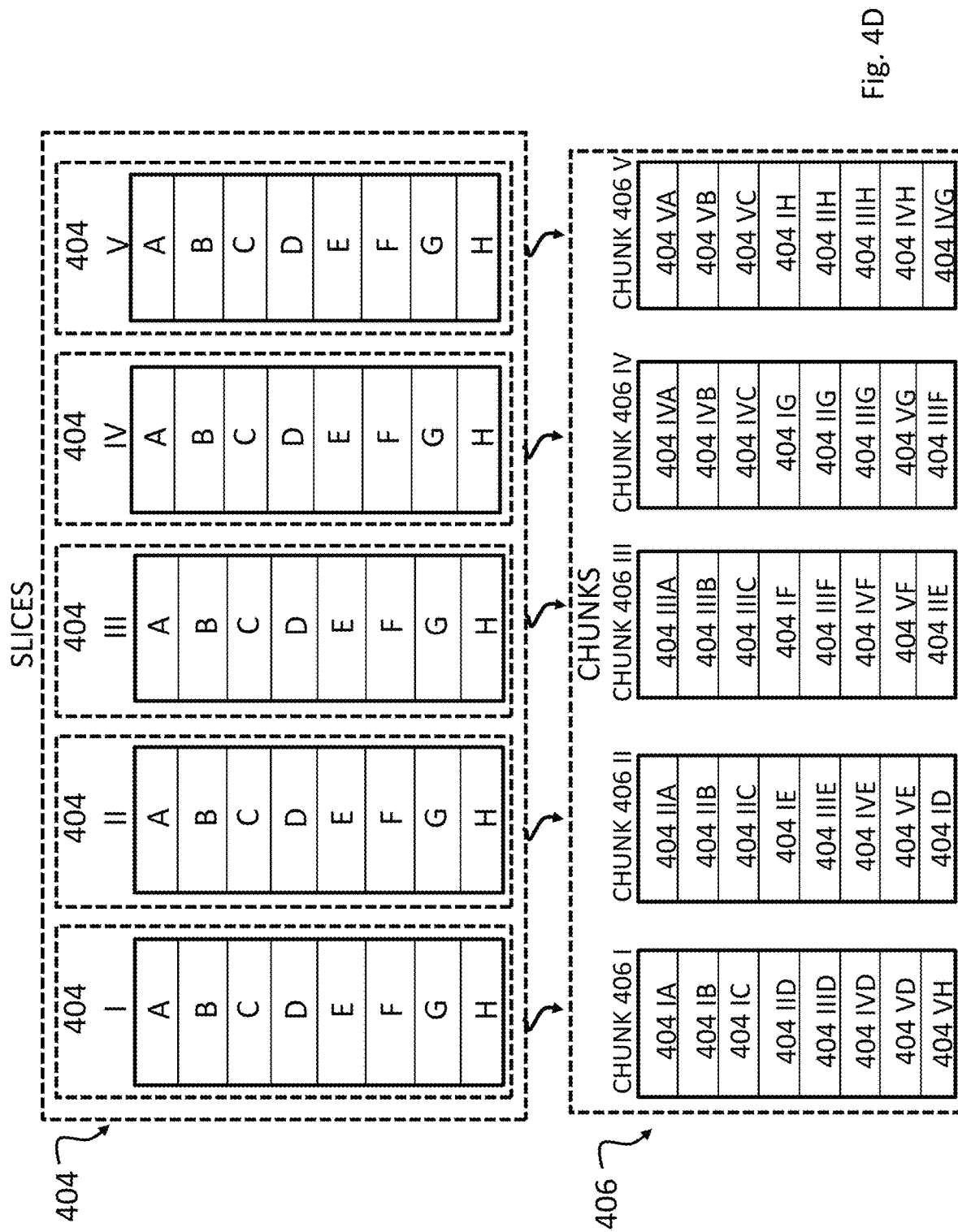

FIG. 4D illustrates continued data management in connection with an example implementation of the present application. In the example shown in FIG. 4D, slices 404 are each encoded into respective data chunks 406 I, 406 II, 406 III, 406 IV, and 406 V. As noted herein, in one or more implementations of the present application, none of the chunks contains all slices 404 comprised in a segment 402, nor all segments 402 within original data 106. The chunks contain slices 404 as a function of an encoding scheme and file splitting scheme, such as shown and described herein. In the example illustrated in FIG. 4D, for example, slices A, B, and C that are comprised in group 404 I (i.e., 404 IA, 404 IB, 404 IC) are encoded into chunk 406 I. Slices A, B, and C, that are comprised in group 404 II (i.e., 404 IIA, 404 IIB, and 404 IIC) are encoded into chunk 406 II. Each of slices A, B, and C from the respective slice groups 404 I, 404 II, 404 III, 404 IV, and 404 V are, accordingly, encoded in chunks 406 I, 406 II, 406 III, 406 IV, and 406 V, respectively.

In one or more implementations of the present application, data chunks 406 are encoded with more information than merely a few respective slices (A, B, and C). In one or more implementations of the present application, additional slices 404 can be encoded in one or more chunks 406, for example randomly or in accordance with a respective algorithm. Additional slices 404 can be provided in data chunks 406 to provide, for example, for a new form of data redundancy, without the negative impact of storage overhead or bandwidth demands that are typically associated with redundant copies of data files in many storage centers. Rather than provide for duplicate redundant copies of original data 106, for example, which could require hundreds of gigabytes or more of additional storage and corresponding bandwidth requirements to store and move such data over one more data communication networks, small fractions of original data 106 (e.g., respective slices 404 of segments 402) are encoded into data chunks 406 and passed through to storage nodes relatively seamlessly, securely and extremely quickly.

Continuing with reference to FIG. 4D, in addition to file slice group 404 I, data chunk 406 I is encoded with some file slices from groups 404 II, 404 III, 404 IV, and 404 V. More particularly and without limiting the disclosure herein to any particular encoding scheme, data chunk 406 I is encoded with three slices from group 404 I (e.g., 404 IA, IB, IC), as well as a slice 404 IID, a slice 404 IIID, a slice 404 IVD, a slice 404 VD, and a slice 404 VH, respectively. All of the remaining chunks illustrated in FIG. 4D, including chunks 406 II, 406 III, 406 IV and 406 V are similarly encoded with file slices, thereby providing for a new form of data redundancy. Accordingly, and as shown by the non-limiting example data encoding scheme illustrated in FIG. 4D, the encoded data chunks 406 I-406 V collectively contain all of the respective data slices 404 comprised in original data 106. By providing a degree of data redundancy in encoded data chunks 406, such as illustrated in the example set forth in FIG. 4D, reconstruction of data is more highly available in the event of failure, corruption or other unplanned negative data event.

The encoded data chunks 406 illustrated in FIG. 4D, comprising five respective chunks, is provided for illustrative purposes only, and it is to be understood that chunks 406 can be encoded with virtually any number of slices, with each chunk being defined to have any respective size.

As noted herein, metadata is generated and can contain information that is usable for reconstructing the related segments from corresponding packages and/or to reconstruct the original data 106. Packages can be generated in accordance with the present application and assigned to respective remote storage nodes which correspond, for example, to an optimized workload distribution. For example, the selection of respective storage nodes can be based on various parameters, including available network bandwidth, geographic proximity, node availability or other suitable criteria. Each of the packages can be transmitted to at least one respective storage node, which can thereafter be retrieved for future assemblage of the segment(s) and data. In addition to providing a virtual roadmap for reconstructing data 106 from, for example, respective encoded data chunks 406, slices 404 and segments 402, examples of information that can be provided in metadata include a location where a package is stored, a location where the original data 106 resides, a respective file system, access rules and permissions, attributes, file names, and other suitable attributes.

Figure 4E:
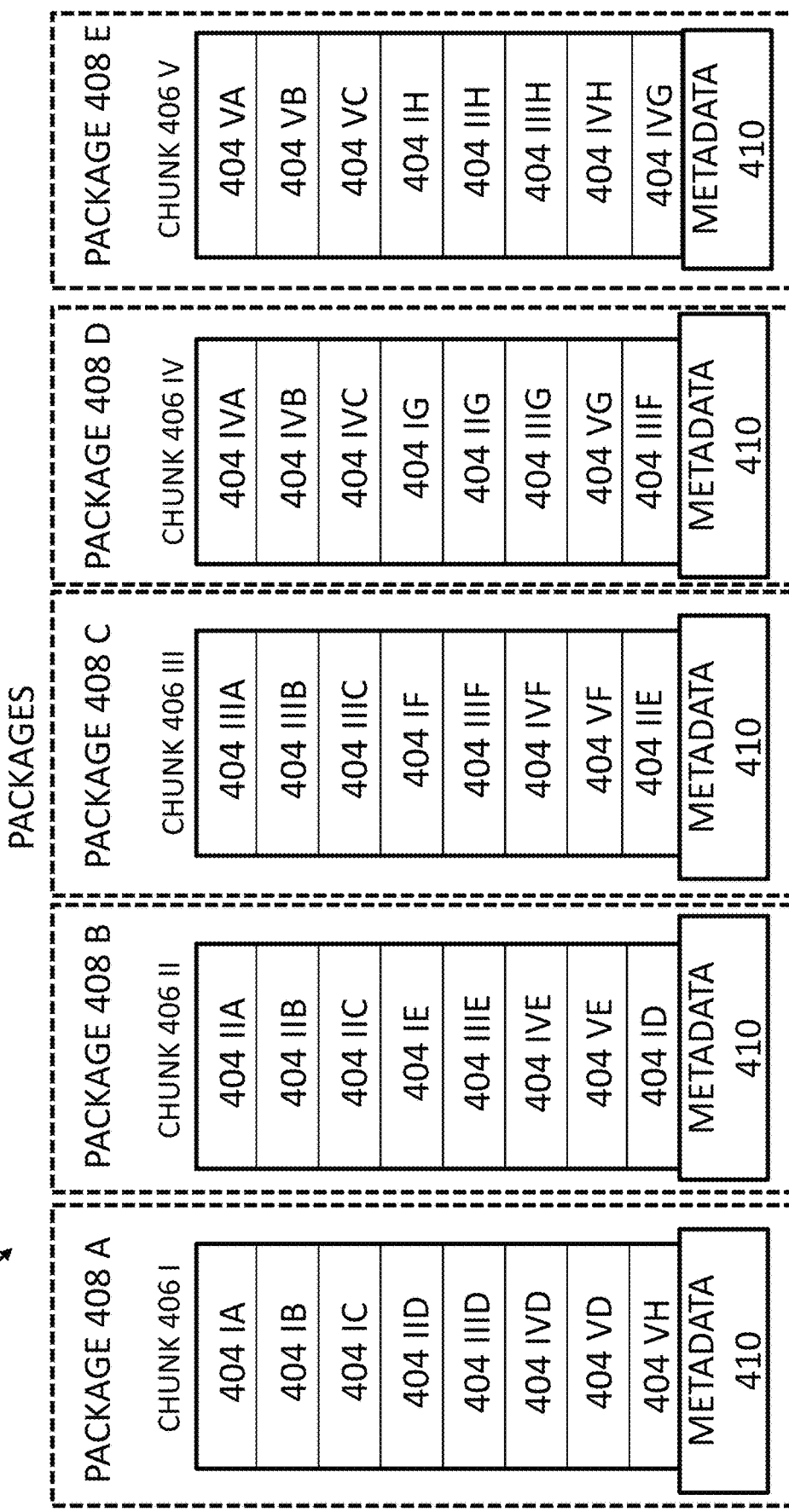
Figure 4F:
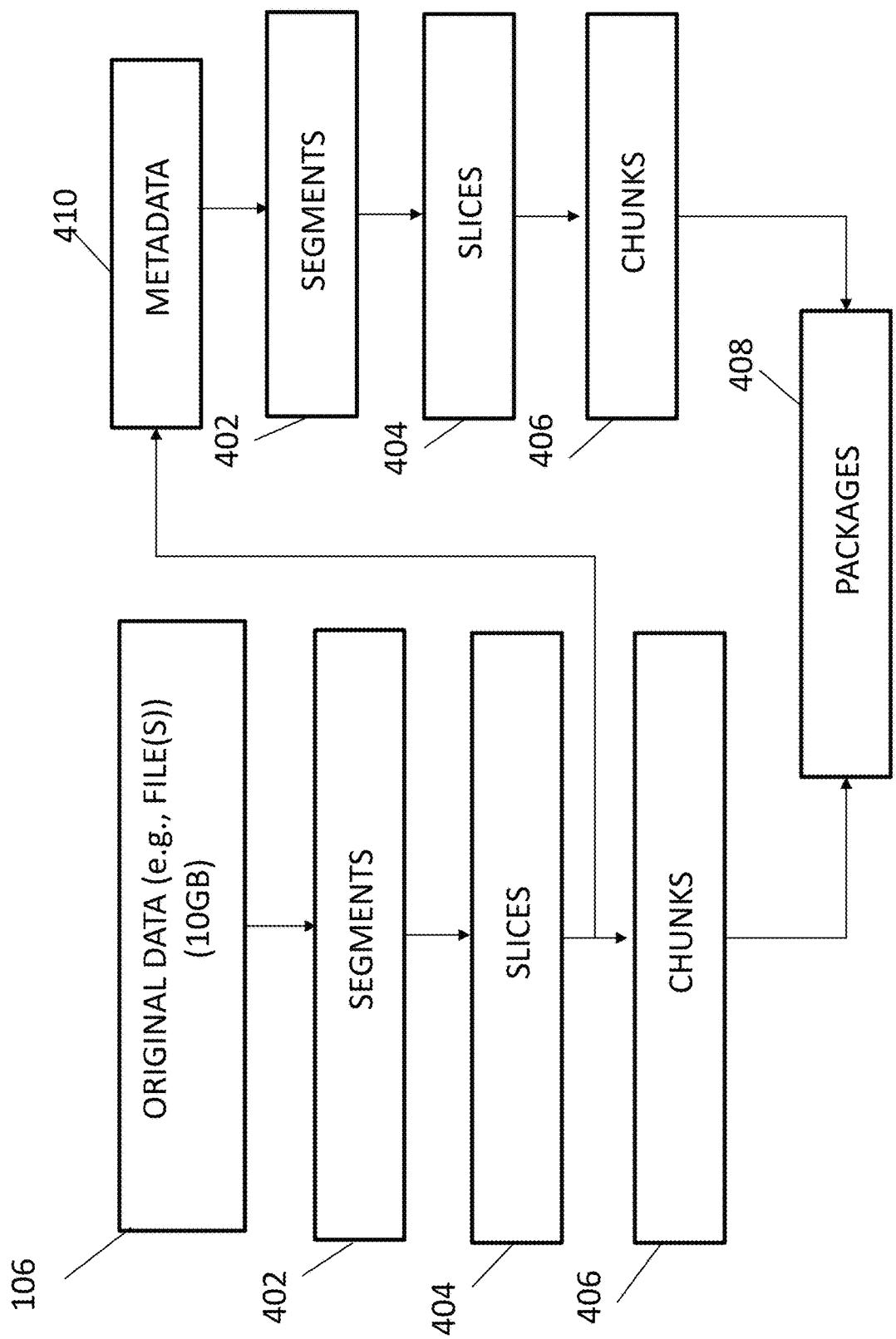

Thus, in addition to encoding data chunks 406 with slices 404, the present application supports encoding data chunks 406 with metadata 410. Referring now to FIG. 4E, packages 408A-408E are shown comprising data chunks 406A-406E (FIG. 4D), and metadata 410 are further encoded into the respective chunks. In one or more implementations, the metadata 410 can be treated or considered as original data 106, and segmented (FIG. 4B), sliced (FIG. 4C), encoded in data chunks (FIG. 4D), and packaged (FIG. 4E). FIG. 4F is a simple block diagram illustrating these respective elements. As noted herein, metadata is created as a function of erasure coding and data distribution and is included in respective data chunks 406.

Figure 5:
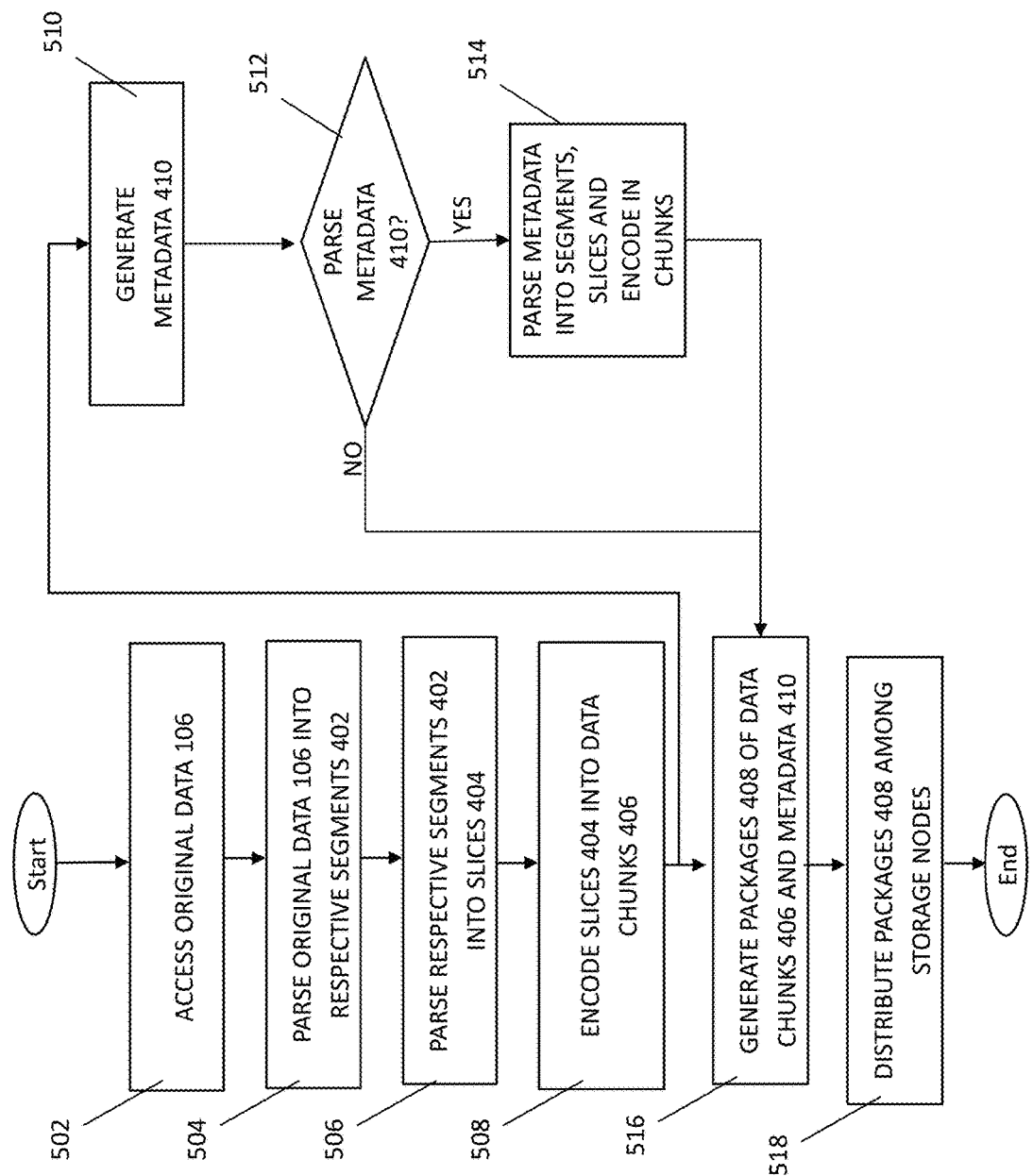
FIG. 5 shows a flow diagram of steps associated with generating packages including encoded metadata, in accordance with an example implementation of the present application.

FIG. 5 shows a flow diagram of example steps associated with preparing and distributing data packages in accordance with an example implementation of the present patent application. After the process starts, at step 502 original data 106 is accessed. Original data 106 can be accessed from a respective data storage 102, or accessed from a client application 109, or a combination thereof. Thereafter, the original data 106 is parsed into respective segments 402 (step 504). The segments 402 are parsed into respective file slices 404 (step 506). The slices 404, thereafter, are encoded into data chunks 406 (step 508). Metadata 410 is generated as a function of the segments 402, slices 404 and chunks 406 (step 510). At step 512, a determination is made whether to parse the metadata 410. The determination can be made as a function of a setting within administrator application 110, a client configuration or an analysis of the metadata, such as by processing system 101. If the result of the determination at 512 is affirmative, then the metadata can be parsed into at least one of segments and slices, and at least some of the metadata can be encoded into chunks 406. Thereafter, the process continues to step 516. If, in the alternative, the result of the determination at 512 is that the metadata is not to be parsed, then the process branches to step 516, and data packages 408 are generated, comprising the data chunks 406 and metadata 410. Thereafter, at step 518, the packages 408 are distributed among storage nodes and the process ends.

Figure 6A:

FIGS. 6A-6K illustrate example interactive data entry screens provided in one or more example graphical user interfaces, in accordance with an implementation of the present application. FIG. 6A includes a map showing locations of storage machines, codec machines, storage nodes and the operational status of such devices, such as whether the devices are online, off-line or disabled. Other information includes a number of online and off-line cloud storage nodes, the number of storage machines and the number of online and off-line codec machines. FIG. 6A also includes a dashboard, formatted as a circular gauge identifying total used space, actual used space, and a number of objects.

Figure 6B:
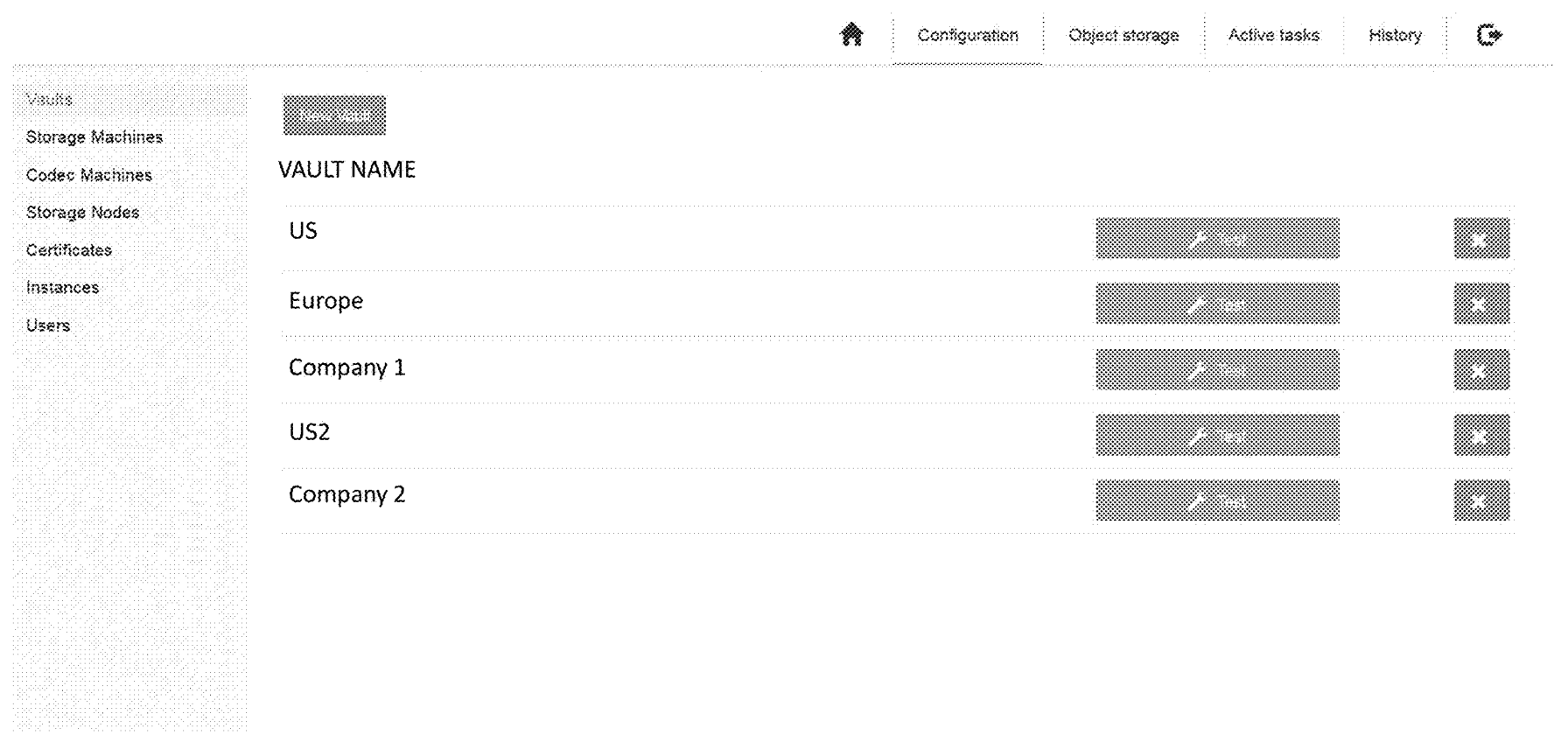

FIG. 6B illustrates an interactive display that identifies various storage vaults and locations thereof, and includes graphical screen controls (e.g., buttons) for testing the vaults. Options are available for selecting vaults, storage machines, codec machines, storage nodes, certificates, instances and users. FIG. 6C shows an example data entry display screen in which storage nodes are selected, and include names of storage devices and providers, as well as options for testing and setting the status (e.g., on or off). Other options include controls for adding new storage nodes.

FIG. 6D illustrates an example data entry display screen that includes controls for editing information associated with a respective storage vault(s). Options displayed in FIG. 6D include editable options for the storage name, the size (e.g., number of) blocks, the relative security (e.g., high security), a degree of redundancy (e.g., a percentage value), and encryption options (e.g., whether to encrypt and a respective encryption algorithm).

Figure 6E:
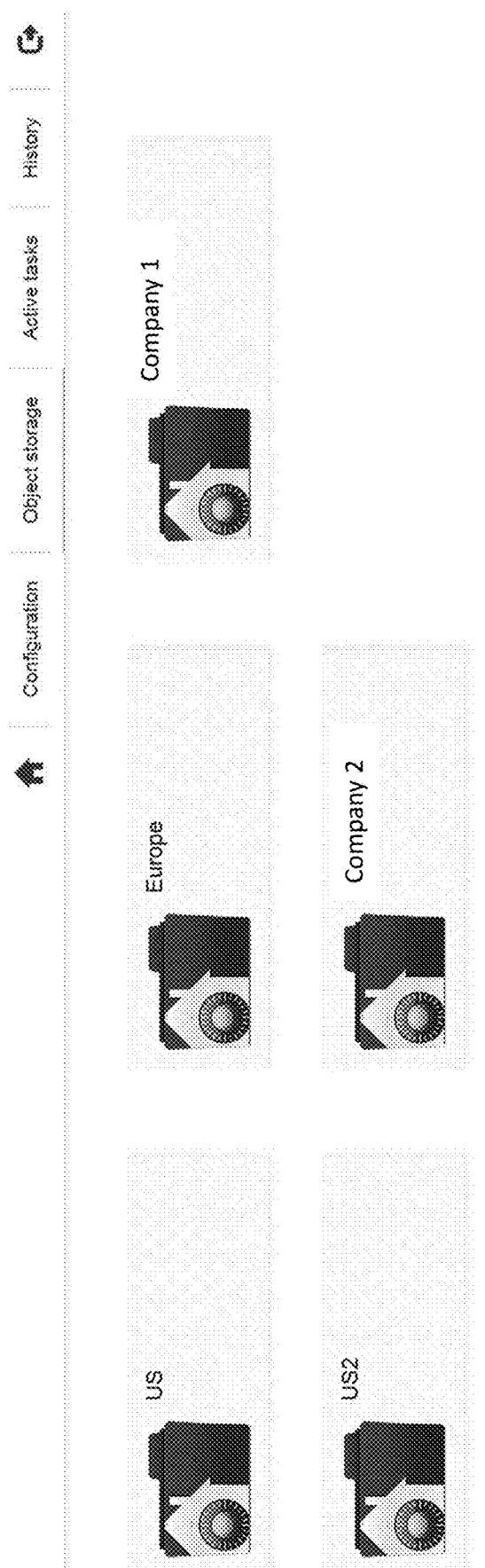
Figure 6F:
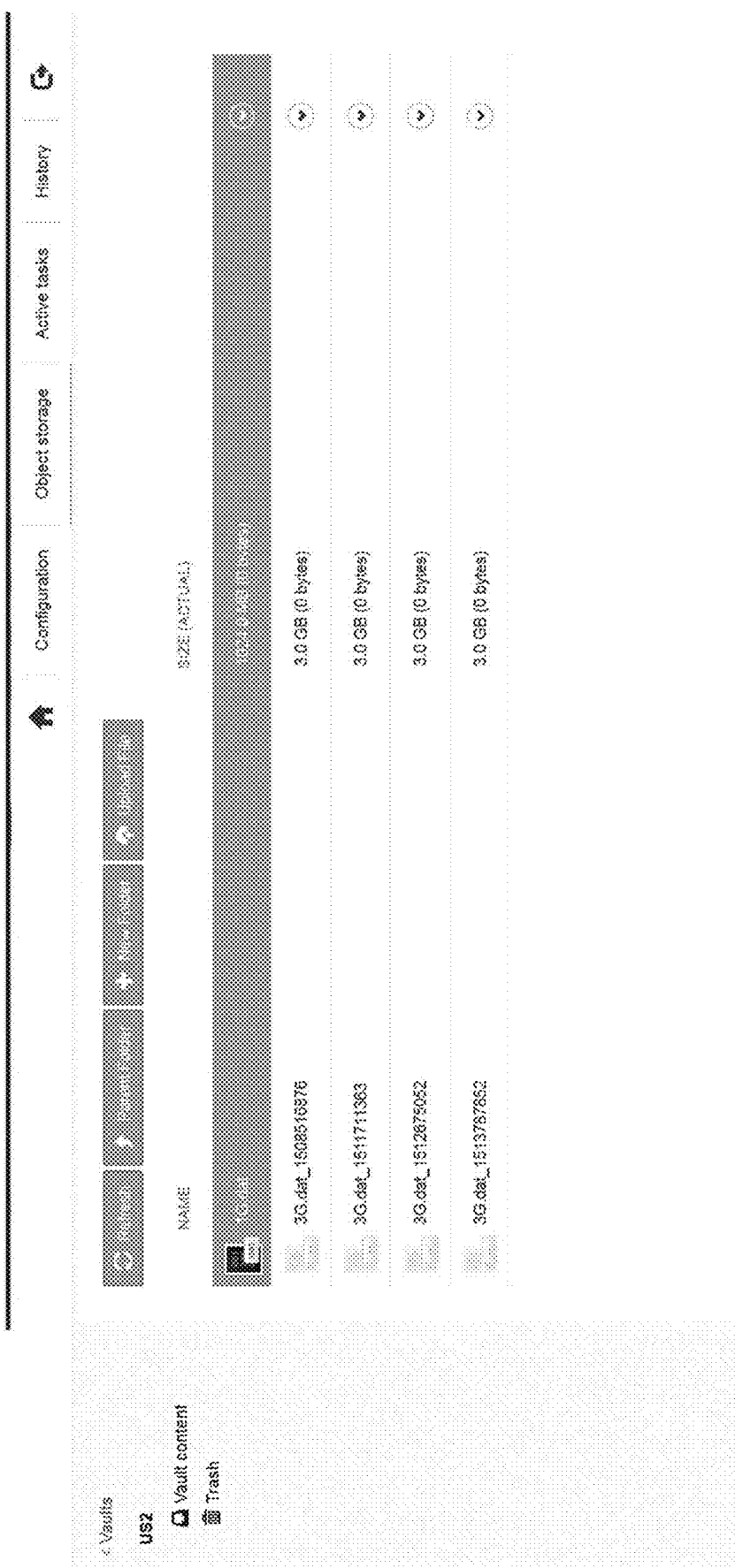
Figure 6H:
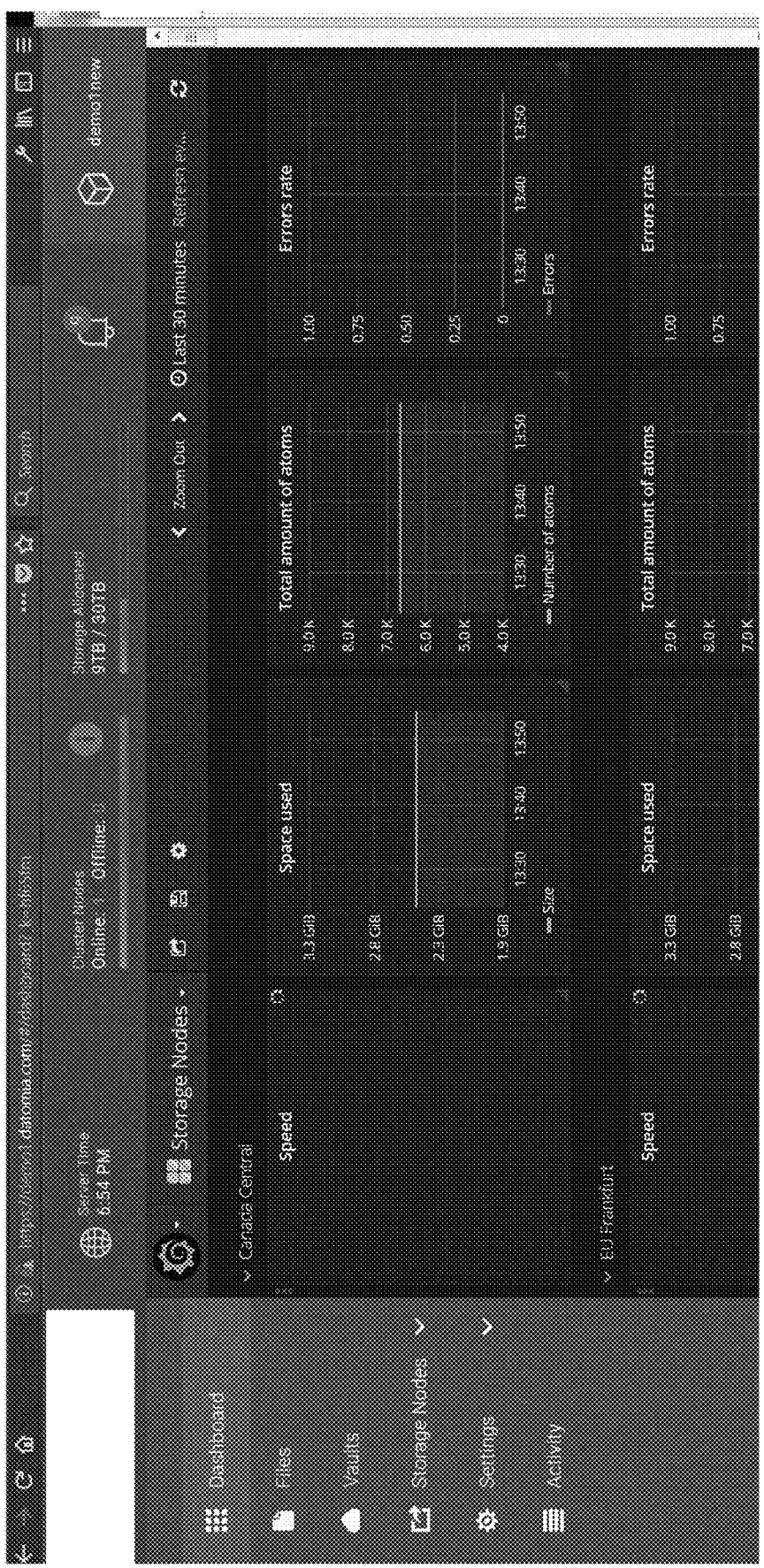
Figure 6I:
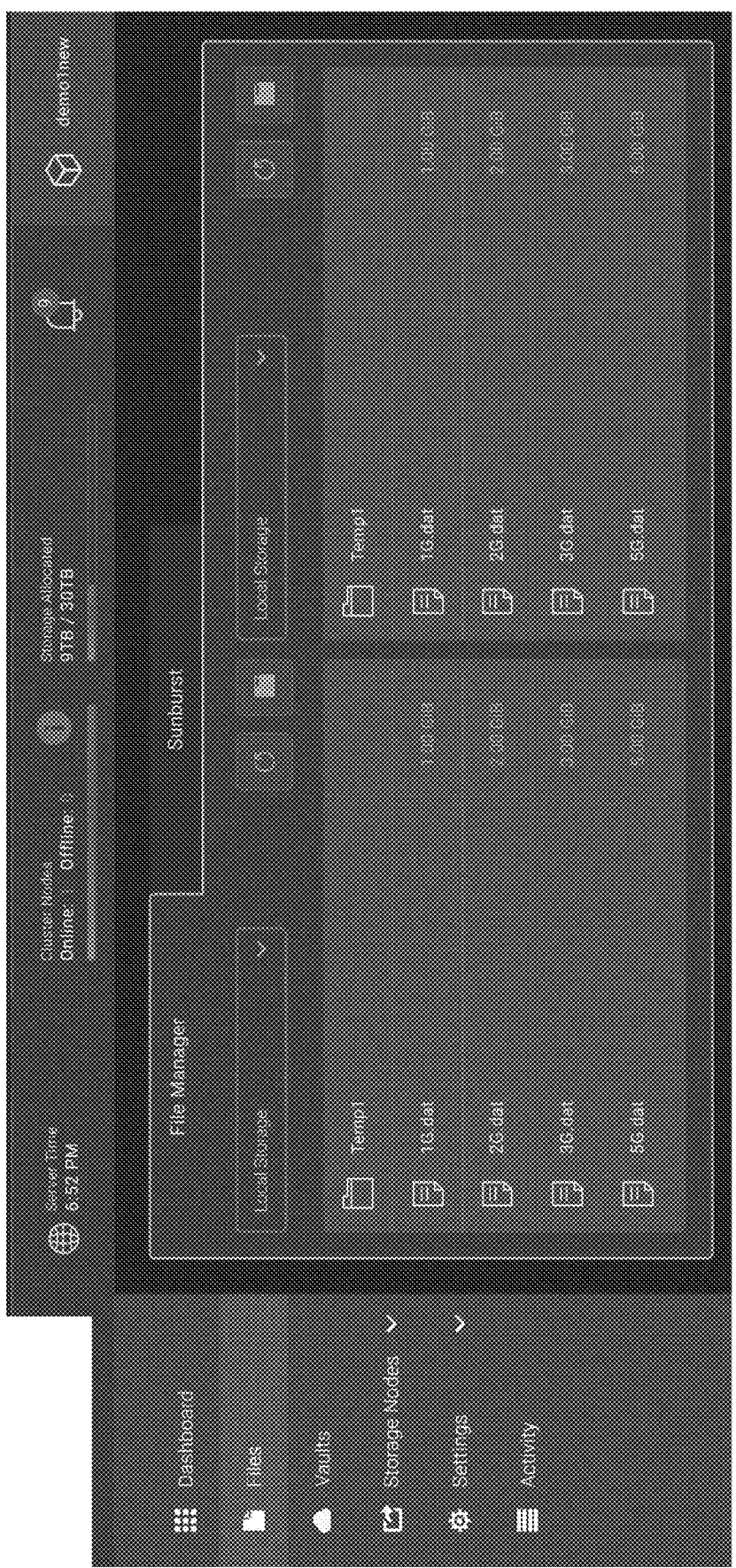
Figure 6J:

FIG. 6E identifies a plurality of object storage vaults, and includes selectable icons associated therewith. Selecting the respective icons provides, for example, information associated with data stored in a respective vault, such as file name and size (FIG. 6F). FIG. 6G illustrates a display screen that provides options for generating a date-based query in connection with a history of a respective storage vault. For example, a start and end date can be submitted and file information (e.g., date, name, size) as well as various management information (e.g., upload, wipe or other functionality) can be provided, as well as performance information (e.g., average speed, duration and storage machine) can be provided.

Figure 6K:
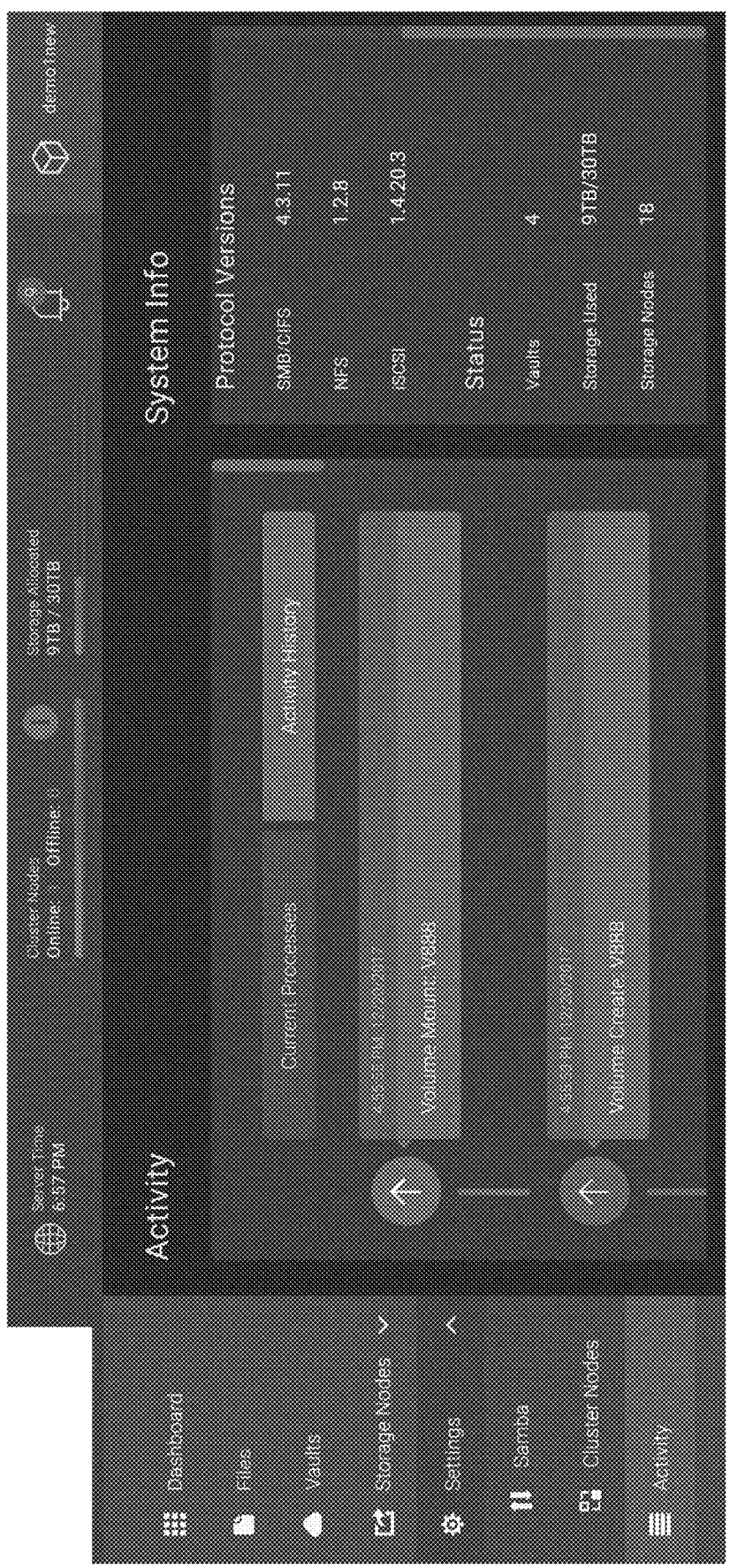

FIGS. 6H-6K show additional display screens associated with a dashboard interface (FIG. 6H) a file manager associated with local and/or remote storage (FIG. 6 I) identifications of storage vaults including file system information, storage capacity and use and management controls, such as to configure respective vaults (FIG. 6J) and setting options, such as in connection with a respective storage vault in connection with respective volumes, protocols and status (FIG. 6K).

In one or more alternative implementations of the present application, and improved handling of metadata 410, such as generated as a function of erasure coding and/or distribution, is provided. Recognizing that it is not uncommon for storage devices to fail, such as disks configured with or accessible by a server, there is a particular need to ensure that metadata 410 be preserved and always accessible. Unlike known centralized metadata databases, which require replication and duplication, both locally and geographically, the present application can include a virtual file system and that can be implemented as a virtual RAID, which can be self-managing and that can exclusively store metadata associated with the encoding and distribution functionality shown and described herein. For example, metadata 410 is generated as a function of original data 106 that have been segmented, sliced and encoded into data chunks, such as shown and described herein. In addition to distributing the encoded chunks 406 in packages 408 across a plurality of data storage nodes, a new layer on top of an existing platform can be created and used to store the metadata 410. Given the significant amount of data activity occurring across a plurality of storage vaults and potentially terabytes of original data 106 belonging to respective companies, for example, it is recognized that a significant amount of metadata 410 can and will be generated in accordance with the teachings herein. Such metadata 410 is highly significant, as it is needed for locating data packages 408 and reconstructing original data 106 based on at least a portion thereof. By providing a RAID-based virtual file system exclusively for storage and maintenance of the metadata, and additional layer of security and reliability is ensured.

In one or more implementations of the present application, it is conservatively estimated that 5% of total storage be allocated for a virtual RAID filesystem, exclusively for storage and maintenance of a database of metadata 410 generated in accordance with the teachings herein. Each server in a respective node and/or vault can be configured with a virtual system that includes such a metadata database, which is regularly updated as packages 408 are generated and distributed in accordance with the teachings herein. Such an architecture increases efficiency in case, for example, one or more disks or other storage devices gets corrupted. A new layer on top of the existing platform can be easily reconstructed in the database re-created as needed.

It is recognized herein that generating and distributing packages 408, as shown and described herein, is significantly more efficient and secure than providing remote access and storage of big data via a traditional RAID system. By allocating a relatively very small amount of storage space in a virtual RAID file system just for metadata, however, provides for redundant and convenient access to the metadata with relatively low overhead. Managing this implementation is relatively simple, as well, as size and mapping variables can be adjusted via an online interface, such as illustrated in FIGS. 6A through 6K.

In one or more implementations, the present application provides benefits beyond storage efficiency and security. For example, and in connection with streaming media, the present application can implement use of relatively short programming code, such as by distributing JavaScript that, when executed by a client device provides for access to the content directly from respective data servers. For example, JavaScript executing in a client device can request respective data packages 408 from respective data centers. For every slice 406 and segment 408, the content of original data 106 (which may be multimedia content) can be reassembled and provided to the client device extremely quickly. Such an architecture provides an improvement over streaming content via a specific geographic area such as a city and respective network, and operates more akin to a bit torrent and eliminates a need for a single source of data.

Other improvements and benefits of the present application can be found in various implementations, such as in connection with delivery of smart contracts, enforcement of digital rights management and providing for an application programming interface ("API") for client devices to call to a respective namespace and have content set forth in the original data 106 seamlessly and securely.

Thus as and described herein, the present application provides for high performance with ultra-high data resilience. Unlike known systems in which erasure coding that increases data resilience often comes with a cost of latency, due CPU or network bottlenecks, the present application provides for intelligent digital fragments that solve challenges typically faced in connection with speed and scalability. The present application effectively moves from the hardware level and the software level effective to a data level, comprised in encoded chunks and packages 408 that take advantage of erasure coding and distribution. Relatively small files can be aggregated into one single object to reduce the number of objects to be transmitted to storage nodes, and to reduce amount of metadata. Objects can be partitioned into segments, and each segment can be further encoded. Thus, a number of encoded chunks are produced from each segment, and the chunks can be encapsulated with corresponding metadata in packages, which are transferred to storage nodes.

In one or more implementations of the present application, a distributed storage system is provided that includes system devices that are configured to process, distribute and/or access client data securely, quickly, efficiently over a set of storage nodes. Such processing system devices can include one or several server clusters, in which each server cluster is configured with or as a file system server and a number of processing servers. A specially designed object-based file system can be included and deployed within each server cluster. File system servers of the server clusters can operate to maintain identical instances of the object-based file system. More particularly, a frequently used part of an object-based file system may be maintained within the processing system, while an entire object-based file system can be packed in a plurality of encoded chunks, encapsulated into packages and, thereafter, distributed over a set of storage nodes. Object search speed is, accordingly, enhanced as a result of selection of an appropriate tree data structure or a directed graph. An example object-based file system of the present application operates over large data blocks, referred as compound blocks. Compound blocks significantly reduce an amount of metadata, the number of operations performed by the object-based file system and the number of objects transmitted to storage nodes. In one or more implementations, a merging of NAS technology and object storage is provided, wherein files are also configured as objects, each having a unique ID. This provides the ability for files to be accessed from any application, from any geographic location and from any public or private storage provider, with simple HTTPS protocols, regardless of the same object being filed in a sub-folder on the NAS file system. This further provides enterprise applications with a multi-vendor storage solution that has all benefits of object storage.

Furthermore, implementations of the present application allow for mixing of storage nodes from multiple vendors, and provide functionality for users to select any respective ones of storage providers, including on-site and off-site, and to switch between storage providers at will. Moreover, by providing key storage at the client level, block and file system storage is configured to meet the needs of an increasingly distributed and cloud-enabled computing ecosystem. With block-based storage, blocks on disks are accessed via low-level storage protocols, such as SCSI commands, with little overhead and/or no additional abstraction layers. This provides an extremely fast way to access data on disks, and various high-level tasks, such as multi-user access, sharing, locking and security, can be deferred to operating systems.

The subject matter described above is provided by way of illustration only and should not be construed as limiting. Various modifications and changes can be made to the subject matter described herein without following the example embodiments and applications illustrated and described, and without departing from the true spirit and scope of the present invention.

What is claimed is:

1. A method for providing secure distributed storage and transmission of electronic content over at least one communication network, the method comprising:
   receiving, by at least one processor configured by executing instructions stored on non-transitory processor-readable media, at least one data file;
   parsing, by the at least one processor, the at least one data file into a plurality of segments, wherein each one of the segments has a respective size;
   dividing, by the at least one processor, each of the plurality of segments into a plurality of slices, wherein each one of the slices has a respective size;
   encoding, by the at least one processor, a plurality of data chunks, each data chunk comprising i) a portion of at least two of the slices from a first segment and ii) a plurality of portions of at least one respective slice from each of at least two other of the plurality of segments, wherein no portion comprises an entire slice;
   generating, by the at least one processor, metadata that represents at least the respective encoding of the plurality of data chunks;
   packaging, by the at least one processor, each of the data chunks with at least the metadata;
   assigning, by the at least one processor, each of the packages to respective remote storage nodes; and
   transmitting, by the at least one processor, each of the packages to the respectively assigned remote storage node.

2. The method of claim 1, wherein the step of packaging includes erasure coding, wherein the metadata is encoded and not visible to unauthorized users.

3. The method of claim 2, further comprising abstracting, by the at least one processor, the metadata with two or more of: additional metadata associated with a respective remote storage node; a configuration of a data vault; a hyperlink to an active data vault; and information representing a current state of data blocks.

4. The method of claim 1, wherein the metadata includes information for reconstructing related segments from corresponding packages and/or information for reconstructing the at least one data file from the plurality of segments.

5. The method of claim 1, wherein each of the packages include at least some redundant information from at least one other package.

6. The method of claim 1, further comprising determining by the at least one processor at least one parameter representing at least one of available network bandwidth, geographic proximity, and node availability, wherein selection of respective remote storage nodes is made as a function of the at least one parameter.

7. The method of claim 1, further comprising applying, by the at least one processor, categories of data, wherein the step of encoding is based at least in part on a respective category.

8. The method of claim 1, wherein the respective storage nodes are provided as network addressable storage.

9. The method of claim 1, further comprising providing, by the at least one processor, a graphical user interface that is configured to display at least one map showing locations of the respective storage nodes and a respective operational status of the respective storage nodes.

10. The method of claim 9, wherein the graphical user interface includes an interactive dashboard that identifies information associated with available storage space, used space, and a number of stored data objects.

11. A system for providing secure distributed storage and transmission of electronic content over at least one communication network, the system comprising:
    at least one processor, wherein the at least one processor is configured by executing instructions stored on non-transitory processor-readable media to perform the steps of:
    receiving at least one data file;
    parsing the at least one data file into a plurality of segments, wherein each one of the segments has a respective size; dividing each of the plurality of segments into a plurality of slices, wherein each one of the slices has a respective size;
    encoding a plurality of data chunks, each data chunk comprising i] a portion of at least two of the slices from a first segment and ii) a plurality of portions of at least one respective slice from each of at least two other of the plurality of segments, wherein no portion comprises an entire slice;
    generating, by the at least one processor, metadata that represents at least the respective encoding of the plurality of data chunks;
    packaging each of the data chunks with at least the metadata;
    assigning each of the packages to respective remote storage nodes; and
    transmitting each of the packages to the respectively assigned remote storage node.

12. The system of claim 11, wherein the step of packaging includes erasure coding, wherein the metadata is encoded and not visible to unauthorized users.

13. The system of claim 12, wherein the non-transitory processor-readable media further have instructions that, when executed by the at least one processor, cause the at least one processor to abstract the metadata with two or more of: additional metadata associated with a respective remote storage node; a configuration of a data vault; a hyperlink to an active data vault; and information representing a current state of data blocks.

14. The system of claim 11, wherein the metadata includes information for reconstructing related segments from corresponding packages and/or information for reconstructing the at least one data file from the plurality of segments.

15. The system of claim 11, wherein each of the packages include at least some redundant information from at least one other package.

16. The system of claim 11, wherein the non-transitory processor-readable media further have instructions that, when executed by the at least one processor, cause the at least one processor to determine at least one parameter representing at least one of available network bandwidth, geographic proximity, and node availability, wherein selection of respective remote storage nodes is made as a function of the at least one parameter.

17. The system of claim 11, wherein the non-transitory processor-readable media further have instructions that, when executed by the at least one processor, cause the at least one processor to apply categories of data, wherein the step of encoding is based at least in part on a respective category.

18. The system of claim 11, wherein the respective storage nodes are provided as network addressable storage.

19. The system of claim 11, wherein the non-transitory processor-readable media further have instructions that, when executed by the at least one processor, cause the at least one processor to provide a graphical user interface that is configured to display at least one map showing locations of the respective storage nodes and a respective operational status of the respective storage nodes.

20. The system of claim 19, wherein the graphical user interface includes an interactive dashboard that identifies information associated with available storage space, used space, and a number of stored data objects.

* * * * *